Patented May 18, 1948

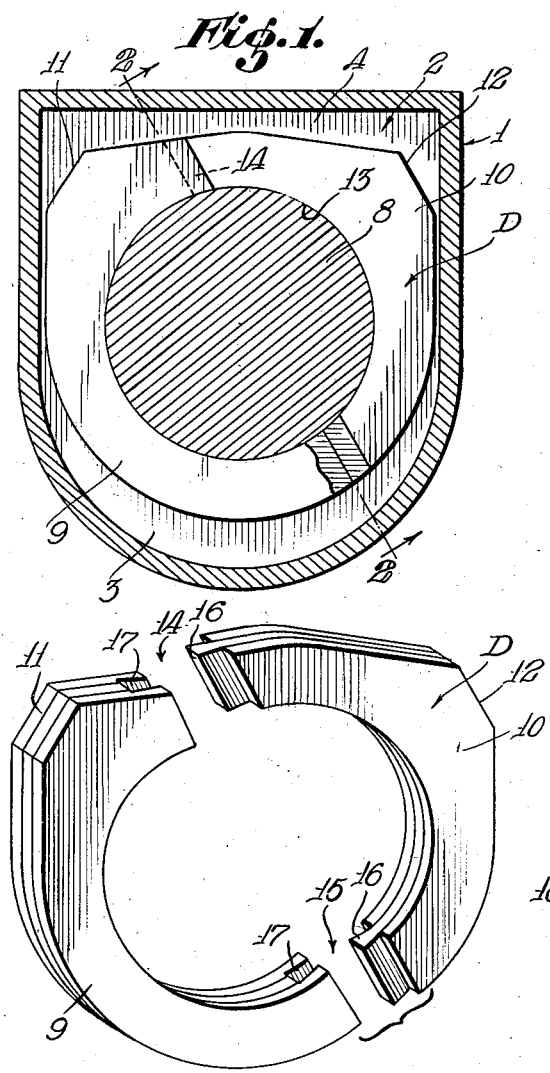

2,441,645

UNITED STATES PATENT OFFICE 2,441,645

JOURNAL BOX AND DUST GUARD

William H. Sale, Richmond, Va.

Application August 22, 1944, Serial No. 550,619

1 Claim. (Cl. 286—6)

This invention relates to a journal box and dust guard.

Heretofore, journal boxes having dust guard chambers either integral or otherwise associated therewith have been constructed so that there is an opening either at the top or bottom or sides, which opening is for the insertion of the dust guard therethrough and its association with the car axle. In all such prior devices it is necessary that some means be provided for closing the opening or openings in the dust guard chamber, whether the opening be at the top, bottom, or sides. This opening must necessarily be closed after insertion of the dust guard regardless of the latter structure and therefore requires time and additional expense, etc. in the provision of the making of the closure for the opening and the removal and replacement thereof for permitting insertion of the dust guard.

In my invention, the journal box and its dust guard chamber, particularly the latter, are so constructed that it is closed at its top, sides, and bottom, and therefore does not require a closure for the opening through which the dust guard is inserted for its association with the railway car axle.

This present invention is primarily directed to the dust guard and its structural characteristics per se. However, it is to be understood that this dust guard is particularly adaptable for association with a journal box and dust guard chamber integral therewith, and the latter being closed at its top, bottom, and sides. It is to be kept in mind, however, that the dust guard and its modifications embodied in this application are adaptable for use in connection with existing types of journal boxes and dust guard chambers.

It is an object of this invention to provide a journal box and dust guard adapted to close or seal the dust guard chamber or well effectively against the escape of oil from the journal box and against the entrance of foreign substances such as dust, grit, etc., into the dust guard chamber or well and then into the journal box.

It is another object of this invention to provide a dust guard which will effectually prevent the journal of a car axle from running hot and thereby prevent accidents and inconvenience, time and trouble, resulting from such condition.

Another object of the invention is to provide a dust guard capable of association with and effective operation within the recess in the dust guard chamber and preferably of such operation and association with a journal box and dust guard chamber of the closed type wherein the necessity of providing a closure for an opening in the dust guard chamber is obviated.

Another object of the invention is to provide a dust guard capable of effective and long durable service in connection with present types of journal boxes and providing structural characteristics of simple and inexpensive nature and being such that the same can be inserted in the dust guard chamber by relatively inexperienced help.

Another object of the invention is to provide a dust guard comprising two or more sections which are detachably associated with each other and the detachable association being such that the central lower part of the guard is free from any connecting joints and thereby prevents or cuts off the leakage of oil at the bottom of the dust guard when the latter has been inserted in the dust guard chamber of a railway car journal box and regardless of whether such dust guard chamber be one of the existing types of dust guard chambers.

Another object of the invention is to provide a sectional, detachable, dust guard which is adapted to be inserted into the dust guard chamber or well at the back thereof and readily assembled interiorly of the journal box with the sections of the dust guard in proper operative position with relation to each other and to the journal box and the dust guard chamber as well as with the car axle.

Another object of the invention is to provide a dust guard consisting of two or more sections, portions of which sections interengage and abut to form the connections for the sections and which connections are effectively and readily accomplished within the dust guard chamber of the journal box and obviating the necessity of any special tool and these connections being such that they may be effectively and accurately brought about by an unskilled workman.

Another object of the invention is to provide detachable connections for two or more sections of a dust guard, which connections serve automatically to hold the dust guard as a whole in its proper assembled relation within the dust guard chamber and the connections being such that oil is prevented from leaking at the bottom of the dust guard within the dust guard chamber.

With these and other objects in view, the invention consists in the novel construction, arrangement, and combination of parts hereinafter fully described, illustrated in the accompanying drawings, and pointed out in the claim hereto appended, it being understood that various changes in the form, proportion, and minor details of construction may be resorted to without departing from the spirit or sacrificing any of the advantages of the invention.

In the drawings:

Figure 1 is an elevational view, partly in section, showing the preferred form of my improved dust guard in its normal position and assembly within the dust guard chamber, this section being taken on the line 1—1 of Fig. 2, looking in the direction of the arrows, and a portion of the dust guard being broken away to show one form of interlocking means for holding the sections of the dust guard together.

Figure 2 is a central, vertical, sectional view along the lines 2—2 of Fig. 1.

Figure 3 is an exploded view of the dust guard as shown in Figs. 1 and 2.

Figure 4 is a front elevational view of a modified form of a dust guard.

Figure 5 is a view along the lines 5—5 of Fig. 4, showing the particular type of interlocking joints for the sections of the dust guard.

In the accompanying drawings, in which are illustrated the preferred embodiments of the invention in Figs. 1, 2, and 3, 1 designates a journal box which is provided with a dust guard chamber 2. The dust guard chamber 2, as will be noted, is of hollow construction and is provided with a well 3 at its lower portion, and a space 4 at its upper portion.

By referring particularly to Figs. 1 and 2, it will be seen that the upper slightly oppositely inclined edge of the dust guard is adjacent and spaced from the upper inner portion of the top of the dust guard chamber. This construction thereby enables less material for the construction of the dust guard chamber and the dust guard itself. The reason for this is that the upper portion of the dust guard is so dimensioned and its height is somewhat reduced and its upper edge is slightly oppositely inclined as compared with the former guards. By somewhat reducing the height of the upper portion of the dust guard, it serves its purpose admirably and requires less material, yet permits the sections of the dust guard to be readily and effectively inserted from the rear opening in the dust guard chamber. It will be seen therefore that when the dust guard is inserted in the dust guard chamber, the well 3 in the bottom portion thereof will be automatically formed and that the space 4 will also be provided for purposes later described. The general construction of the dust guard chamber therefore permits ready insertion of the sections of the dust guard therein as will be explained hereinafter.

The dust guard chamber is completely closed at its top, bottom, and sides and has its inner and outer walls 5 and 6 thereof integral therewith and is provided with the usual central circular opening 7 for the reception of a car axle 8.

The dust guard D may be made of suitable fibrous material which is rigid in its entirety, yet capable of being flexed somewhat. In other words, this dust guard can be made of almost any suitable material and it is preferable that the material have inherent flexible characteristics, yet be rigid enough to support itself in an effective working position when assembled within the journal box. The sections constituting the dust guard are denoted at 9 and 10 and such dust guard as a whole is of generally the usual exterior contour and design except for the fact that in the present invention, the upper edges 11 and 12 of each section 9 and 10, respectively, are inclined, or, if preferred, may be curved, and also the upper edge is oppositely inclined, so as to permit of a more ready insertion and association of the two sections within the dust guard chamber of the journal box. Section 9 of the dust guard, when assembled with section 10, provides the usual circular central opening 13 which is so dimensioned and calculated that it snugly fits about the car axle when inserted in the dust guard chamber. It is to be noted that section 9 constitutes substantially two-thirds of the entire dust guard and that section 10 constitutes the other one-third of the entire dust guard. This formation is desirable in that it permits interlocking, preferably dovetail, connections 14 and 15 to be utilized. The dovetail connections 14 and 15 are of the usual type and merely consist of one section being provided with the dovetail projection 16 and the other section being provided with the usual dovetail recess 17. The connection 14, which is at the top of the dust guard is diametrically disposed, off vertical center, with respect to a similar dovetail connection 15 which is at the bottom portion of the dust guard.

By so disposing the dovetail or other connections, it will be seen that the extreme curved lower central portion of the dust guard is absolutely free of any connecting joints or the like and this effectively prevents leakage of oil adjacent the bottom of the dust guard. In other words, because of the fact that this lower portion of the dust guard is free of any connections, there are no joints to be sealed for preventing the leakage of oil in the lower portion of the dust guard.

With regard to the modification of the invention as shown in Figs. 4 and 5, the generic feature of my invention is carried out in that the lower portion of the dust guard is absolutely free of any connecting joints and thereby effectively seals against the leakage of oil adjacent the lower portion of the dust guard, and the connections of the several sections are diametrically disposed with relation to each other, off vertical center, the same as in the preferred form of my invention.

In this modification, the dust guard as a whole is composed of sections 18 and 19 which are similarly formed and a lower central section 20. The lower interior portion of each section 18 and 19 is provided with a recess 21 which opens interiorly toward the opening 13 in the dust guard as a whole. These recesses each are provided with a substantially vertical back wall 22 and an inclined lower or bottom wall 23. The lower section 20, which is of arcuate formation and of the same thickness and dimensions as the sections 18 and 19, is provided with oppositely disposed tongues 24 and 25, which tongues are so dimensioned that they fit snugly within the recesses 21 in each of the sections 18 and 19. The end wall portion 26 of the lower dust guard section 20 is slightly inclined and cooperates with the inclined inner walls 27 which are formed immediately below each of the recesses 21 in each section 18 and 19. It is clear therefore that the bottom section of the dust guard 20 is readily inserted in the recesses 21 and thus, when so inserted and combined with the other two sections, the dust guard as a whole thereby results and of course the interlocking tongue and groove connections are detachable.

The upper portion of each section of the dust guard 18 and 19 is provided with flat faces which abut at 28. These abutting faces of the two sections are preferably held in place by means of a staple 29 or other similar fastening device. As in the preferred form of the invention, the outer upper portions of each of the sections 18 and 19 are inclined or rounded as at 11 and 12. The manner of inserting the dust guard as shown in Figs. 1 and 2 is that section 9 is first inserted through the rear opening in the journal box and is thrust or moved upwardly therein and surrounds substantially two-thirds of the circumference of the axle. The formation of the hollow interior of the dust guard chamber permits this section to be moved upwardly therein and then drop downwardly about the axle. After this section 9 has been inserted, then the other section 10 is inserted through the same rear opening and is thrust or moved upwardly and then brought downwardly so that the dovetail joints 14 and 15 are made to cooperate and interlock and thus the dust guard as a whole is maintained in its relationship within the dust guard chamber and about that portion of the axle extending therethrough. There is by no means a restriction on the manner of inserting this dust guard and instead of moving the section 10 upwardly as aforesaid, it could just as well be inserted by placing the same through the rear opening in the journal box and positioning the dovetail connections in relationship with the other section and moving it upwardly and thereby interlocking the two sections.

In assembling the dust guard as shown in Figs. 4 and 5, it is much the same procedure as the assembly of the dust guards in Figs. 1 to 3 except that here I insert either section 18 or 19, which has preferably associated with it the lower section 20, and thus substantially two-thirds of the guard will be positioned about that portion of the axle within the dust guard chamber. Then the other section is inserted and it, with its recess 21, engages either the projecting tongue 24 or 25 as the case may be and thus the entire guard is associated about that portion of the axle within the journal box dust guard chamber. After insertion of the guard as a whole within the dust guard chamber, then the staple 29 or other suitable securing means is affixed to hold together the two sections 18 and 19 with the associated lower section 20.

By referring to my co-pending application 537,927, filed May 29, 1944, now Patent No. 2,397,753, issued April 2, 1946, particularly Figs. 1 and 2 of the drawings therein, it will be noted that in that application I provided a space or clearance 10 in the upper portion of the dust guard chamber. In this present application, however, this space or clearance 10 is present as denoted at 4 but there is a saving of material in the formation of the dust guard chamber itself because the side walls, etc., and the closed upper top part thereof have been lowered. There is also a saving of material in the dust guard due to the oppositely inclined upper edge thereof and the oppositely inclined opposite sides thereof. This is accomplished by reducing the height of the walls of the upper portion of the dust guard and so dimensioning the same that when the sections constituting the entire dust guard are inserted, the upper extreme edge will be spaced from contact with the inner side of the top of the closed dust guard chamber. These two features are important and an advancement in the saving of material over that construction shown in my prior patent application.

It is to be understood that the particular material from which the dust guard described herein is made is not limited in any sense. Suitable flexible, fibrous material has proved satisfactory but these guards may be made of wood or a plastic composition. The formation of the sections comprising the dust guard and its modifications are such that they may be manufactured in quantity lots at a very low cost and such manufacture may be accomplished by stamping, molding, or effected in any suitable manner and by any process or method that may prove efficacious.

This new dust guard and its association and combination with the closed dust guard chamber of a journal box is indeed an advancement in the art to the extent that it is so readily adaptable to the closed type of journal box and existing types of journal boxes which require closures for the openings, and which can be inserted and associated in the dust guard chamber by inexperienced help and when so inserted, it will automatically and definitely be correctly and properly disposed for effective working cooperation within the dust guard chamber and effectively seal the chamber from foreign matter and prevent leakage of oil.

What is claimed is:

For use in a unitary car axle journal box consisting of a single integral structure having a rear axle receiving opening and provided with a dust guard chamber in the form of a continuous recess extending entirely around the interior of the journal box at the rear opening thereof and completely closed at the top, bottom and sides by continuous unbroken walls, a sectional dust guard of stiff flexible material having the characteristics of stiff fiber and provided with an opening to receive the journal of a car axle, the upper edge of the dust guard being slightly inclined downwardly from the center toward the side edges of the dust guard and the corners thereof at the top being cut off and the side edges of the dust guard having straight substantially vertical side portions arranged substantially contiguous to the side walls of the chamber of the journal box and extending downwardly from the cut away top corners and the bottom edge of the dust guard being substantially semi-circular and extending upwardly to the lower ends of the vertical portions of the side edges, said dust guard being cut across the top at an angle at one side of the center at a point between the center and one of the cut away corners and at the bottom at the opposite side of the center of the dust guard forming two sections having abutting interlocked end edges, one of said sections extending continuously from the top adjacent the center thereof to one side edge and downwardly at said side edge to the bottom edge and across the bottom of the dust guard toward the opposite side thereof to a point beyond the center of the bottom.

WILLIAM H. SALE.

REFERENCES CITED

The following references are of record in the file of this patent:

UNITED STATES PATENTS

| Number | Name | Date |
|---|---|---|
| Re. 8,085 | Stephenson | Feb. 19, 1878 |
| 170,838 | Fitzgerald | Dec. 7, 1875 |
| 493,176 | McLaren | Mar. 7, 1893 |
| 555,531 | Peckham | Mar. 3, 1896 |
| 764,162 | Symington | July 5, 1904 |
| 886,822 | Lafferty | May 5, 1908 |
| 1,284,173 | Bell | Nov. 5, 1918 |
| 1,350,429 | Trowbridge | Aug. 24, 1920 |

FOREIGN PATENTS

| Number | Country | Date |
|---|---|---|
| 41,160 | Denmark | 1929 |